(12) United States Patent
Horsfield et al.

(10) Patent No.: US 6,443,414 B1
(45) Date of Patent: Sep. 3, 2002

(54) SEAT TRACK ASSEMBLY WITH RELEASE MECHANISM HAVING A ROTATABLE ROD

(75) Inventors: Keith Horsfield, Port Sydney; Michael J. Wilms, Bracebridge; Gregory James Alexander Andrigo, Port Sydney, all of (CA)

(73) Assignee: Dura Global Technologies, Rochester Hills, MI (US)

( * ) Notice: Subject to any disclaimer, the term of this patent is extended or adjusted under 35 U.S.C. 154(b) by 0 days.

(21) Appl. No.: 09/691,389

(22) Filed: Oct. 18, 2000

(51) Int. Cl.[7] .............................................. F16M 13/00
(52) U.S. Cl. ....................................... 248/429; 297/341
(58) Field of Search ................................ 248/421, 423, 248/424, 429; 297/329, 344.1, 344.15, 351, 378.1, 341

(56) References Cited

U.S. PATENT DOCUMENTS

| | | | | |
|---|---|---|---|---|
| 4,767,157 A | * | 8/1988 | Kazsoka et al. | 297/322 |
| 5,207,480 A | | 5/1993 | Johnson | 297/344 |
| 5,348,373 A | * | 9/1994 | Stiennon | 297/344.1 |
| 5,352,019 A | | 10/1994 | Bauer | 297/341 |
| 5,383,640 A | | 1/1995 | Johnson | 248/372.1 |
| 5,626,392 A | | 5/1997 | Bauer | 297/341 |
| 5,785,292 A | * | 7/1998 | Muraishi et al. | 248/429 |
| 5,855,349 A | | 1/1999 | Nini | 248/429 |
| 5,873,558 A | * | 2/1999 | Sakamoto | 248/429 |
| 5,931,436 A | * | 8/1999 | Rohee | 248/430 |
| 6,227,596 B1 | * | 5/2001 | Foucault et al. | 296/65.13 |
| 6,267,344 B1 | * | 7/2001 | Tateyama et al. | 248/421 |

FOREIGN PATENT DOCUMENTS

| | | | | |
|---|---|---|---|---|
| FR | 1071302 B1 | * | 8/1954 | 248/429 |
| JP | 61-241223 B1 | * | 10/1986 | 248/429 |

* cited by examiner

Primary Examiner—Leslie A. Braun
Assistant Examiner—Jon Szumny
(74) Attorney, Agent, or Firm—C. R. Kiczek

(57) ABSTRACT

A seat track assembly includes a first track and a second track operably engaging the first track so that the second track is slideable between a full forward position and a fill rearward position with respect to the first track. A locking device is supported on the second track and is moveable between a locked position where the locking device maintains the second track in a desired position relative to the first track and an unlocked position where the second track is movable relative to the first track. A release member is pivotally supported about a first axis and is movable between a normal position and a release position. The release member maintains the locking device in the unlocked position when the release member is in the release position. The seat track assembly also includes a rod rotatable about a second axis. The rod is operatively connected to the release member such that rotation of one of the rod or the release member rotates the other of the rod or the release member.

18 Claims, 10 Drawing Sheets

SEAT TRACK ASSEMBLY WITH RELEASE MECHANISM HAVING A ROTATABLE ROD

FIELD OF THE INVENTION

The present invention generally relates to an assembly for mounting a seat within a vehicle, and, more particularly, relates to a seat track assembly for mounting a seat for horizontal movement with respect to the vehicle.

BACKGROUND OF THE INVENTION

It is generally well known to provide seat track assemblies for mounting seats within vehicles so that the seats are adjustable in a forward and rearward direction within the vehicle. Various types of release mechanisms are used to release the tracks to allow the seat to be adjusted.

One common type of release mechanism utilizes a "towel bar," which is a generally U-shaped rod that is pivotally mounted to dual pairs of sliding tracks and is connected to locking mechanisms on each pair of tracks. When the towel bar is pivoted upward, the locking mechanism are unlocked and the tracks are free to slide. One disadvantage of such a release mechanism is that the towel bar must extend from the first pair of tracks to the second pair of tracks at a position where a user can operate the towel bar, thus taking up space within a vehicle. Another disadvantage of using a towel bar is that each side of the towel bar must be aligned with the respective locking mechanism and pair of tracks so that both of the locking mechanisms will be released at the same time. This dual alignment requirement lowers the tolerance levels allowed in such a release mechanism. The more pairs of tracks that are used, the more disadvantageous the towel bar becomes, because more space is taken up and because tolerance levels go even lower. The lower tolerance levels of the towel bar makes the use of such a release mechanism impractical on a seat with more that two pairs of seat tracks because misalignment of one or more of the mounts could potentially force the seat into an unlocked position.

Another common type of release mechanism utilizes an L-shaped rotary release handle and rod that is parallel to and positioned closely to one pair of seat tracks. The release handle and rod are rotated to release the seat tracks. The rotary release handle takes up space due to the rotary path that the handle must take to release the seat tracks. These types of release mechanisms are usually complex and usually include a slave cable from a first locking mechanism on a first pair of tracks to a second locking mechanism on a second pair of tracks. The use of this slave cable makes the use of such a release mechanism impractical and disadvantageous on a seat with more than two pairs of seat tracks. This is because the slave cable is usually positioned in between the two pairs of seat tracks and because the locking mechanism on a third pair of seat tracks may not release simultaneously with the other locking mechanisms if any slack develops in any of the cables.

Accordingly, there is a need in the art for a seat track assembly with a release mechanism which utilizes relatively little space in a vehicle and may be used on any number of pairs of seat tracks without lowering the tolerance levels of the assembly.

SUMMARY OF THE INVENTION

The present invention provides a seat track assembly for mounting a seat in a motor vehicle which overcomes at least some of the above-noted problems of the related art. According to the present invention, a seat track assembly comprises a first track and a second track operably engaging the first track so that the second track is slideable between a full forward position and a full rearward position with respect to the first track. A locking device is supported on the second track and is moveable between a locked position where the locking device maintains the second track in a desired position relative to the first track and an unlocked position where the second track is movable relative to the first track. A release member is pivotally supported about a first axis and is movable between a normal position and a release position. The release member maintains the locking device in the unlocked position when the release member is in the release position. The seat track assembly also includes a rod rotatable about a second axis. The rod is operatively connected to the release member such that rotation of one of the rod or the release member rotates the other of the rod or the release member.

In another aspect of the present invention, a seat track assembly is provided that comprises a first track and a second track operably engaging the first track so that the second track is slideable between a full forward position and a full rearward position with respect to the first track. A locking device is supported on the second track and is moveable between a locked position where the locking device maintains the second track in a desired position relative to the first track and an unlocked position where the second track is movable relative to the first track. A release member is pivotally supported about a first axis and is movable between a normal position and a release position. The release member maintains the locking device in the unlocked position when the release member is in the release position. The seat track assembly also includes a rod rotatable about a second axis. A link member is pivotally connected to the release member and fixedly attached to the rod such that rotation of one of the rod or the release member rotates the other of the rod or the release member.

In yet another aspect of the present invention, the seat track assembly comprises a plurality of lower tracks and a corresponding plurality of upper tracks. Each one of the upper tracks operably engages one of the lower tracks and is slideable between a full forward position and a full rearward position with respect to the respective lower track. The seat track assembly includes a corresponding plurality of locking devices and a corresponding plurality of release members. Each one of the locking devices is supported on one of the upper tracks and is moveable between a locked position where the locking device maintains the respective upper track in a desired position relative to the respective lower track and an unlocked position where the respective upper track is movable relative to the respective lower track. Each release member is pivotally supported about a first axis and is operatively connected to one of the locking devices. Each release member is movable between a normal position and a release position, and each release member maintains the respective locking device in the unlocked position when the respective release member is in the release position. The seat track assembly also includes a rod rotatable about a second axis. The rod is operatively connected to each release member such that rotation of one of the release members rotates the other release members and the rod and rotation of the rod rotates the release members.

From the foregoing disclosure and the following more detailed description of various preferred embodiments it will be apparent to those skilled in the art that the present invention provides a significant advance in the technology and art of seat track assemblies. Particularly significant in this regard is the potential the invention affords for providing a seat track assembly with a release mechanism which utilizes little relative space in a vehicle and may be used on any number of pairs of seat tracks without lowering the tolerance levels of the assembly. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
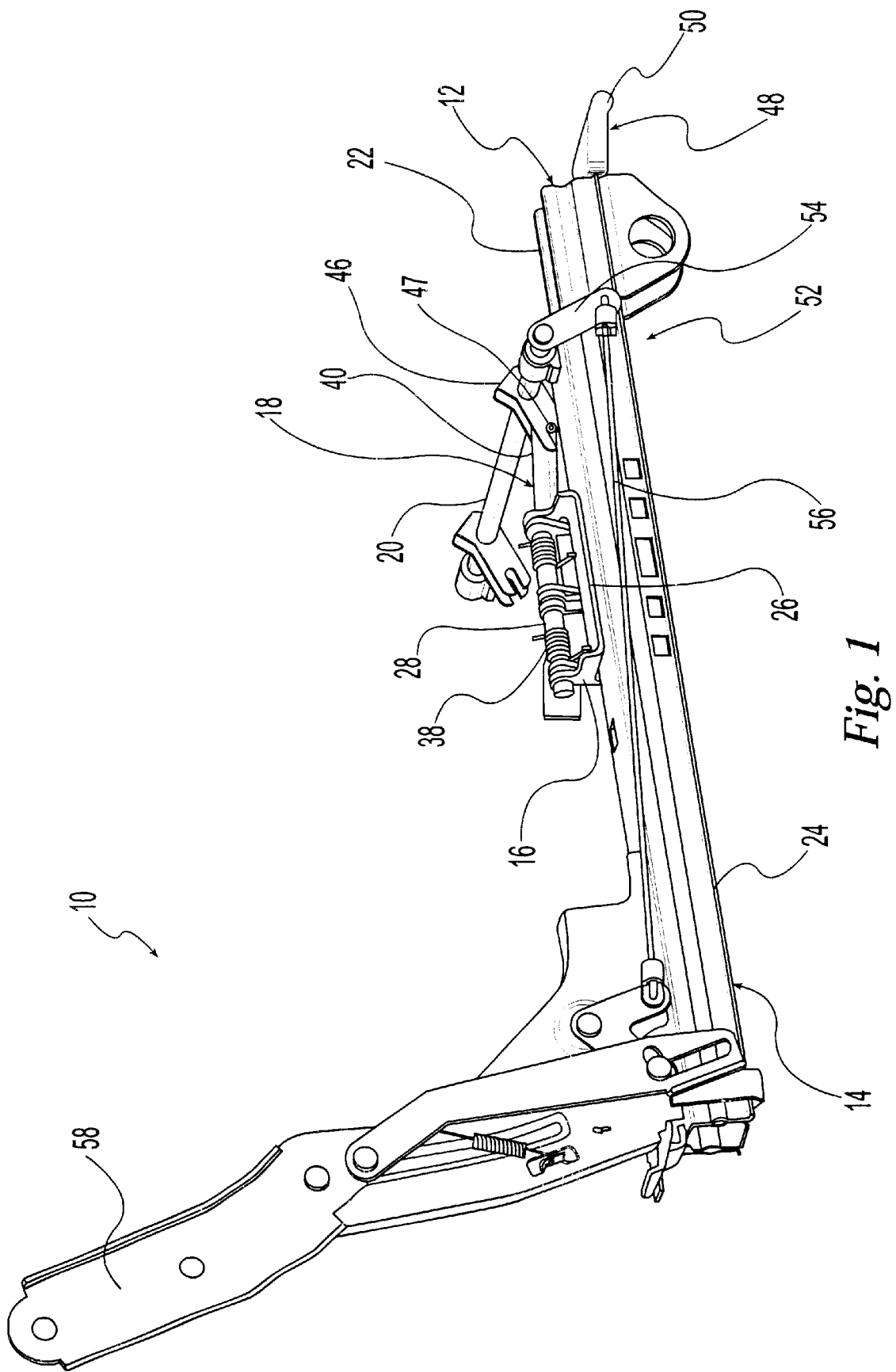
FIG. 1 is a perspective view of a seat track assembly according to one preferred embodiment of the present invention.

It should be understood that the appended drawings are not necessarily to scale, presenting a somewhat simplified representation of various preferred features illustrative of the basic principles of the invention. The specific design features of the seat track assembly as disclosed herein, including, for example, specific dimensions, orientations, and shapes of the release member will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the seat track assembly illustrated in the drawings. In general, up or upward refers to an upward direction in the plane of the paper in FIGS. 1–5 and 7–10 and down or downward refers to a downward direction in the plane of the paper in FIGS. 1–5 and 7–10. In general, fore or forward refers to a direction toward the front of the seat track assembly, that is, in a leftward direction in the plane of the paper in FIGS. 6, 8, and 10 and in a rightward direction in the plane of the paper in FIGS. 7 and 9. Also in general, aft or rearward refers to a direction toward the rear of the seat track assembly, that is, in a rightward direction in the plane of the paper in FIGS. 6, 8, and 10 and in a leftward direction in the plane of the paper in FIGS. 7 and 9.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved seat track assembly and release mechanism disclosed herein. The following detailed discussion of various alternative and preferred embodiments will illustrate the general principles of the invention with reference to a seat track assembly for mounting a seat in a motor vehicle. Other embodiments suitable for other applications will be readily apparent to those skilled in the art given the benefit of this disclosure.

FIGS. 1–10 illustrate a preferred embodiment of a seat track assembly 10 according to the present invention. The seat track assembly 10 comprises a first track 12, a second track 14, a locking device 16, a release member 18, and a rod 20.

In the preferred embodiment, the first track 12 is a lower track 22 and the second track 14 is an upper track 24 operably engaging the lower track 22 so that the upper track 24 is slideable relative to the lower track 22 between a full forward position and a full rearward position. The upper track 24 is used to mount a seat bottom (not shown) so that the seat bottom can be adjusted forwardly and rearwardly within a vehicle.

Figure 3:
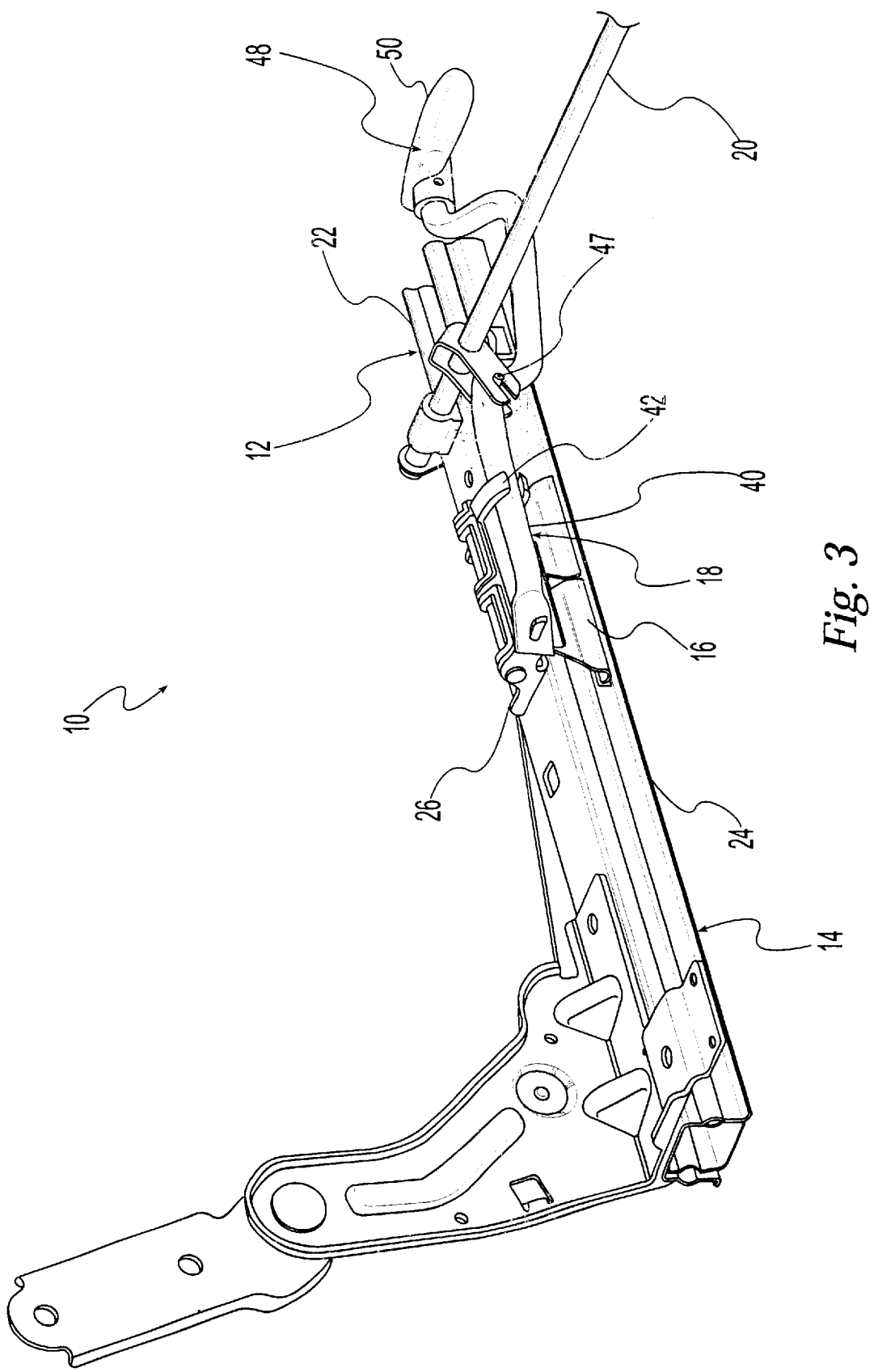
FIG. 3 is a perspective view of the seat track assembly FIG. 2 shown from the opposite side of the seat track assembly.
Figure 6:
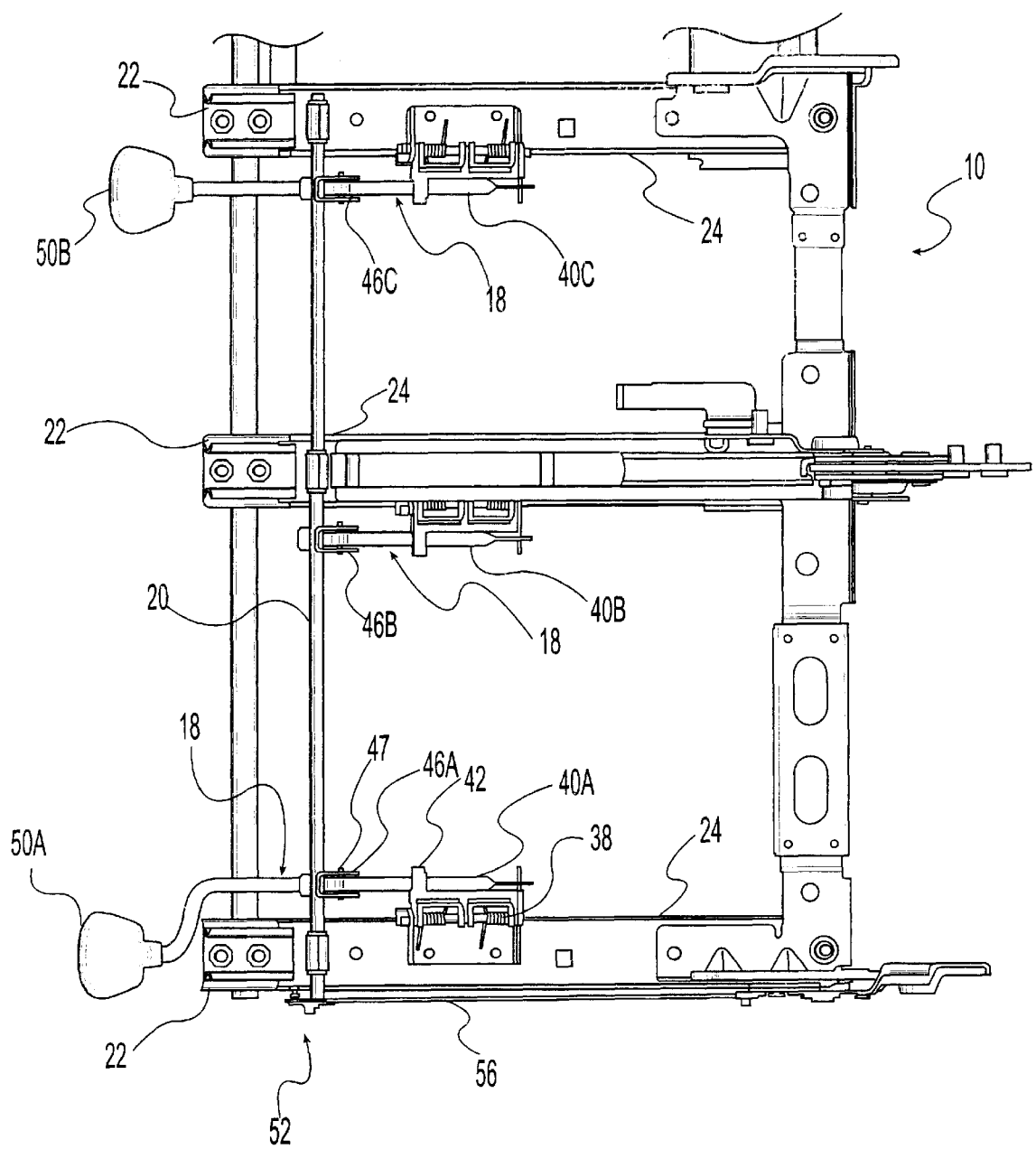
FIG. 6 is a top view of the seat track assembly of FIG. 4.
Figure 7:
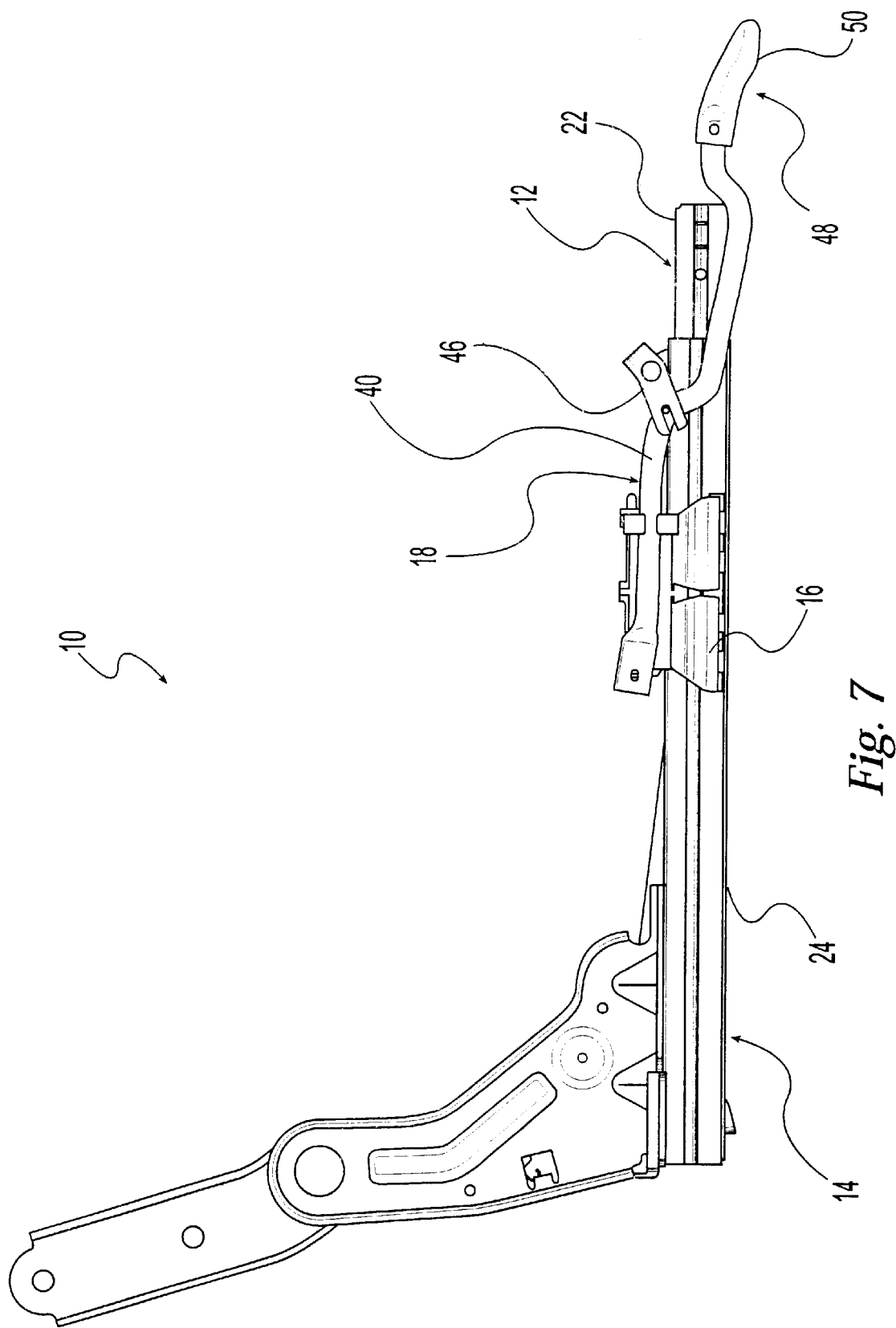
FIG. 7 is a side view of the seat track assembly shown in FIGS. 2 and 3 shown with the locking device in a locked position and the release member in a normal position.
Figure 8:
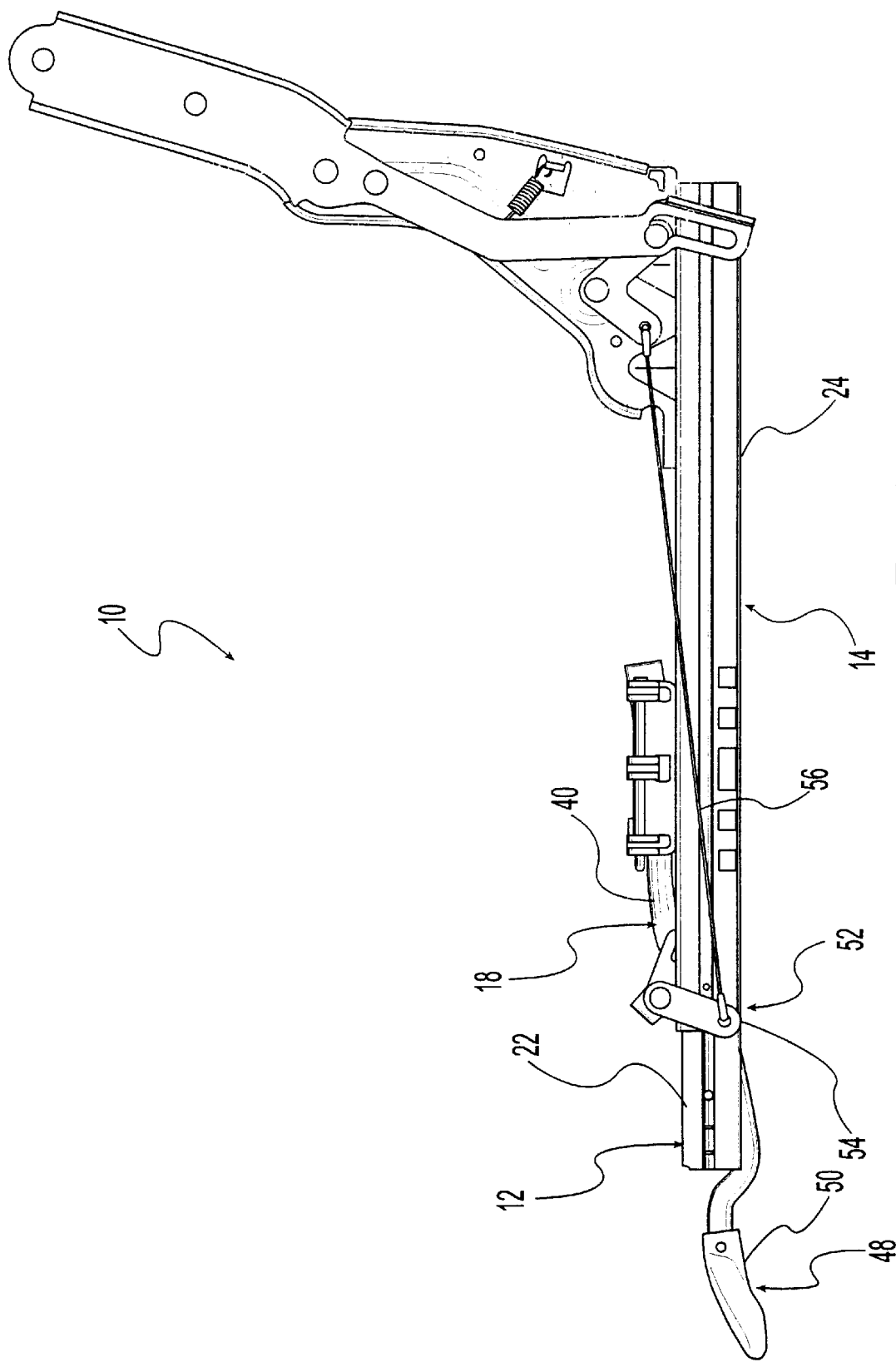
FIG. 8 is a side view of the seat track assembly of FIG. 7 shown from the opposite side.
Figure 9:
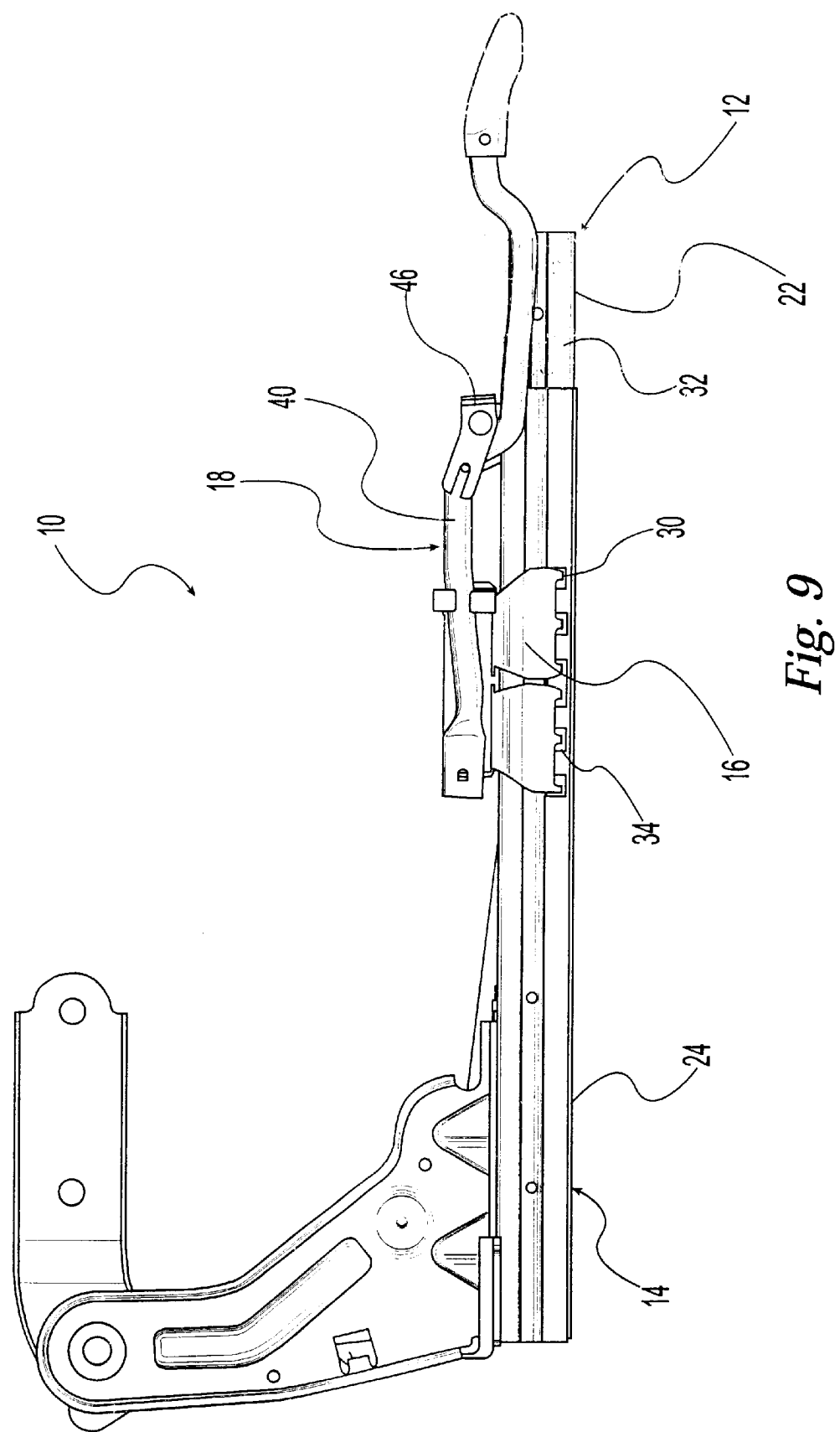
FIG. 9 is a side view of the seat track assembly shown in FIGS. 2 and 3 shown with the locking device in an unlocked position and the release member in a release position.

The locking device 16 is supported on the upper track 24 and is movable between a locked position, as illustrated in FIGS. 3 and 7, where the locking device 16 maintains the upper track 24 in a desired position relative to the lower track 22 and an unlocked position, as illustrated in FIG. 9, where the upper track 24 is movable relative to the lower track 22. The locking device 16 is preferably mounted to a mounting bracket 26 using a pivot pin 28 so that the locking device 16 is rotatable about the pivot pin 28. The locking device 16 includes at least one locking pawl or tooth 30 (FIG. 9). The lower track 22 includes a side wall 32 (FIG. 9) having a plurality of slots 34 (FIG. 9) that receive at least one tooth 30 of the locking device 16 when the locking device 16 is in the locked position. As more fully discussed below, the locking device 16 is rotated to disengage the teeth 30 to place the locking device 16 in the unlocked position. As illustrated in the drawings, more than one locking device 16 may also be utilized in the present invention. The locking device 16 preferably includes a spring 38 (FIGS. 1 and 4–6) or other means for biasing the locking device 16 toward its locked position.

Figure 2:
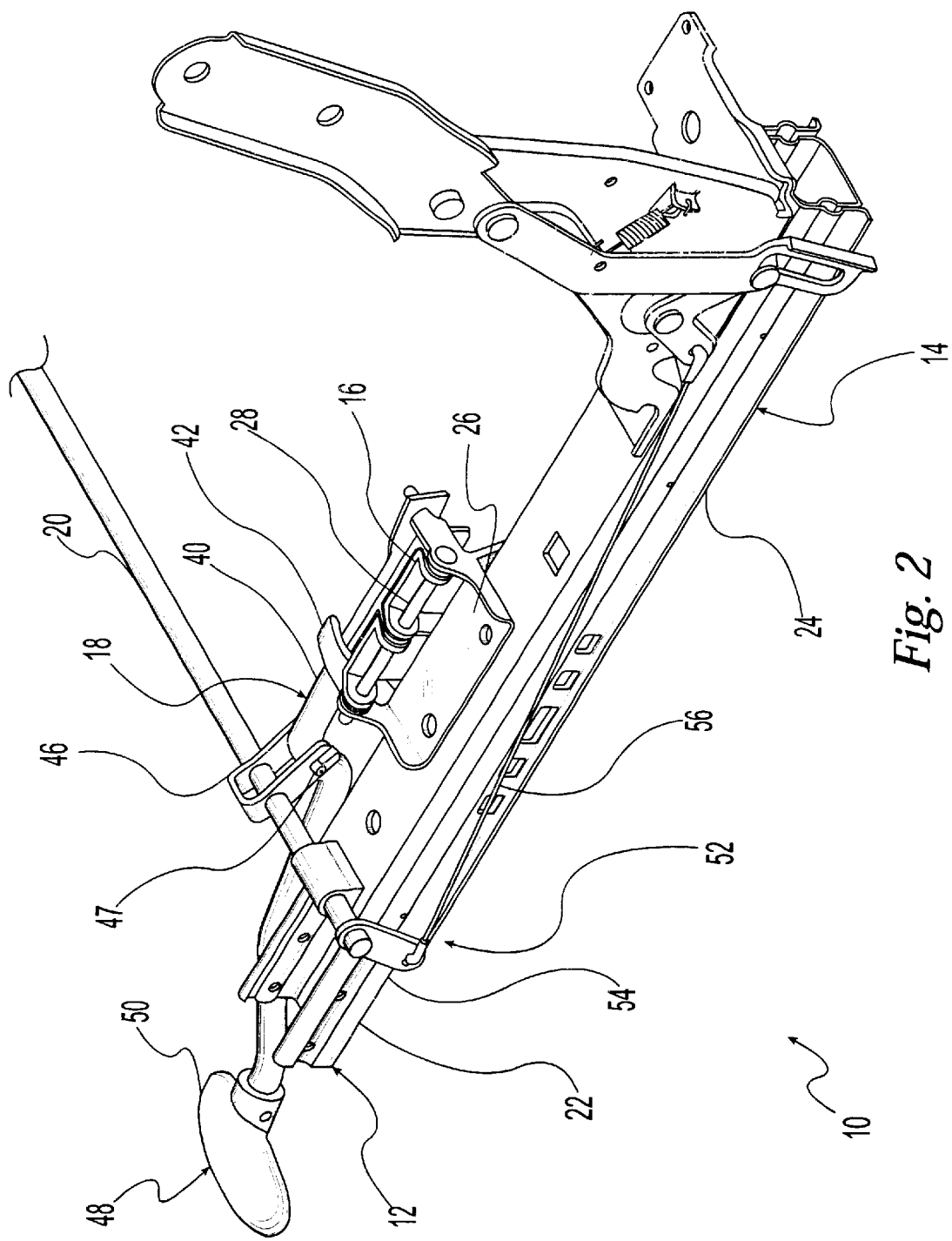
FIG. 2 is perspective view of the seat track assembly of FIG. 1 shown with an opposite orientation and shown from a different perspective.
Figure 10:
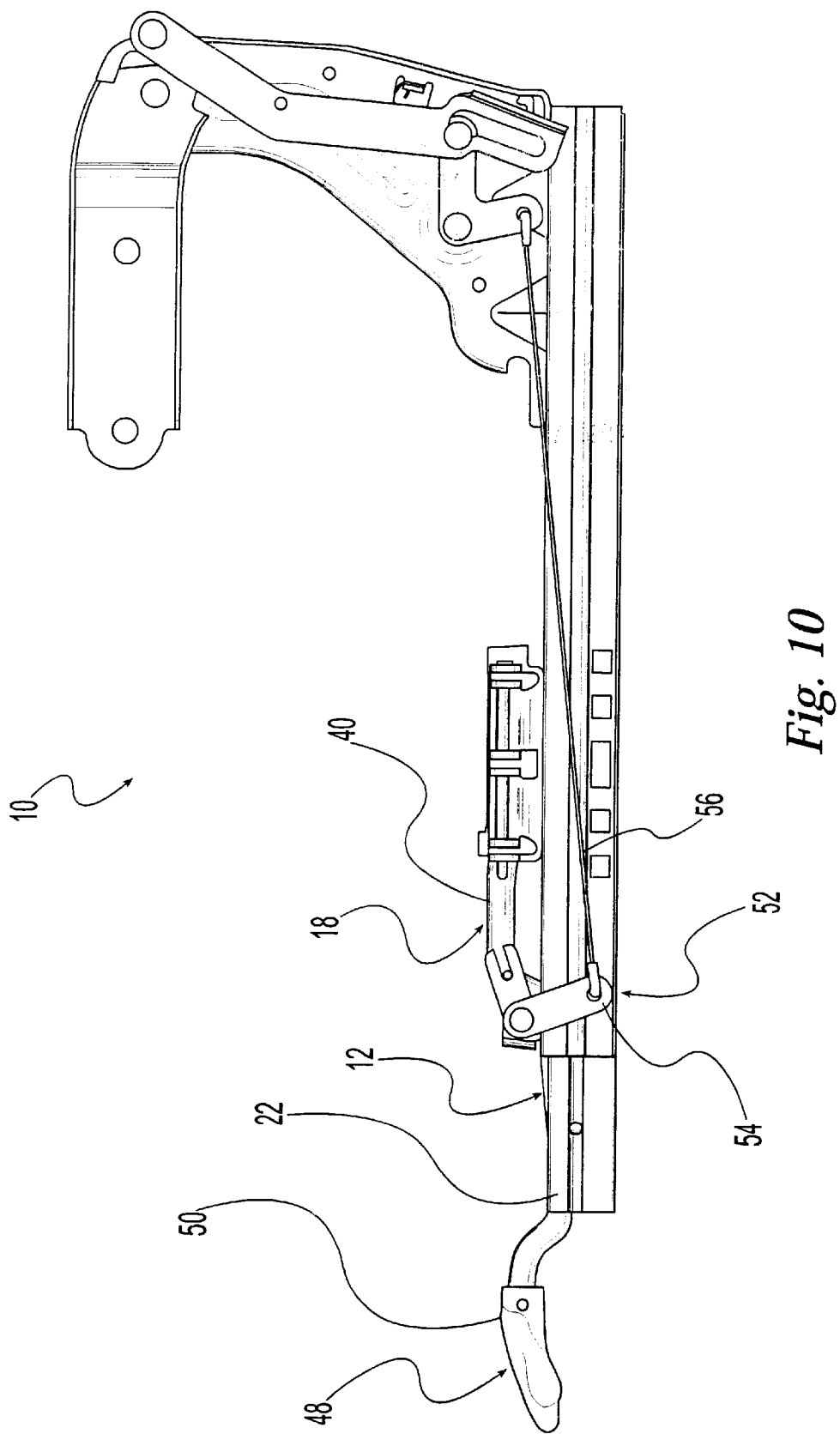
FIG. 10 is a side view of the seat track assembly of FIG. 9 shown from the opposite side.

The release member 18 is operatively connected to the locking device 16 and is moveable between a normal position, illustrated in FIGS. 3 and 7, where the locking device 16 is maintained in its locked position and a release position, illustrated in FIGS. 9–10, where the locking device 16 is maintained in its unlocked position. In the preferred embodiment, the release member 18 is a lever 40 operatively connected to the locking device 16. As illustrated in FIGS. 2–3, the lever 40 may be connected to the locking device 16 using a connection member 42 and may be pivotally connected to the mounting bracket 26 about a first axis of rotation. It will be readily apparent to those skilled in the art given the benefit of this disclosure that other shapes, positions, and axes of rotation of the release member 18 are included in the present invention.

In the preferred embodiment, the rod 20 is operatively connected to the lever 40 using a link member 46 so that rotation of the rod 20 will rotate the lever 40 and rotation of the lever 40 will rotate the rod 20. The link member 46 is pivotally connected to the lever 40 about a pin 47 and is fixedly attached to the rod 20. The rod 20 is rotatable about a second axis that is preferably a longitudinal axis of the rod 20. The longitudinal axis of the rod 20 is substantially perpendicular to longitudinal axes of the upper 24 and lower 22 tracks, and is substantially parallel to the first axis about which the lever 40 is pivotally mounted. The longitudinal axis of the portion of the lever 40 adjacent the locking device 16 is substantially parallel to the longitudinal axes of the upper 24 and lower 22 tracks and is substantially perpendicular to the longitudinal axis of the rod 20. Those skilled in the art will recognize that other relative positioning of the rod 20, the release member 18, and the upper 24 and lower 22 tracks is included in the present invention.

A first control member 48 may be operatively connected to the lever 40 for moving the lever 40 from its normal position to its release position so that the locking device 16 is moved to its unlocked position. In the preferred embodiment, the first control member 48 is a release handle 50 positioned at the front of the seat track assembly 10 for adjusting the position of the upper track 24 relative to the lower track 22. However, those skilled in the art given the benefit of this disclosure will recognize that other shaped control members 48 are included in the present invention. The release handle 50 is operatively connected to the lever 40 so that raising the release handle 50 will move the lever 40 to its release position. When the handle 50 is released, the spring 38 biases the locking device 16 back to its locked position, thereby moving the lever 40 to its normal position and lowering the release handle 50 to its original position.

A second control member 52 may be operatively connected to the rod 20. When the second control member 52 rotates the rod 20, the link member 46 is rotated to move the lever 40 from its normal position to its release position so that the locking device 16 is moved to its unlocked position. In the preferred embodiment, the second control member 52 preferably comprises a link 54 and a control cable 56 operatively attached to a seat back (not shown) or seat back attachment arm 58 so that the cable 56 and link 54 are responsive to folding of the seat back. When the control cable 56 is pulled, the link 54 rotates the rod 20 to rotate the link member 46 and thereby move the lever 40 from its normal position to its release position. When the cable 56 becomes tensionless, the spring 38 biases the locking device 16 back to its locked position, thereby moving the lever 40 to its normal position and rotating the rod 20 and the link 54 to their original position.

The second control member 52 may be used with seats having an "easy entry" feature, where the seat back is pivoted forward and downward into the seat bottom and the seat track is slid forward to allow for greater entry behind the seat, or a "fold and flip" feature, where a seat back is pivoted forward and downward into the seat bottom and then the seat track assembly is pivoted forward in order to create a load floor or storage space where the seat was positioned.

The present invention may be used in connection with a single person seat or in connection with a multiple person bench seat where the seats have varying numbers of pairs of first 12 and second 14 tracks. When multiple pairs of first 12 and second 14 tracks are used, the seat track assembly 10 may include varying numbers of locking devices 16 that are controlled by corresponding release members 18 that are operatively connected to the locking devices 16 and to the rod 20.

Figure 4:
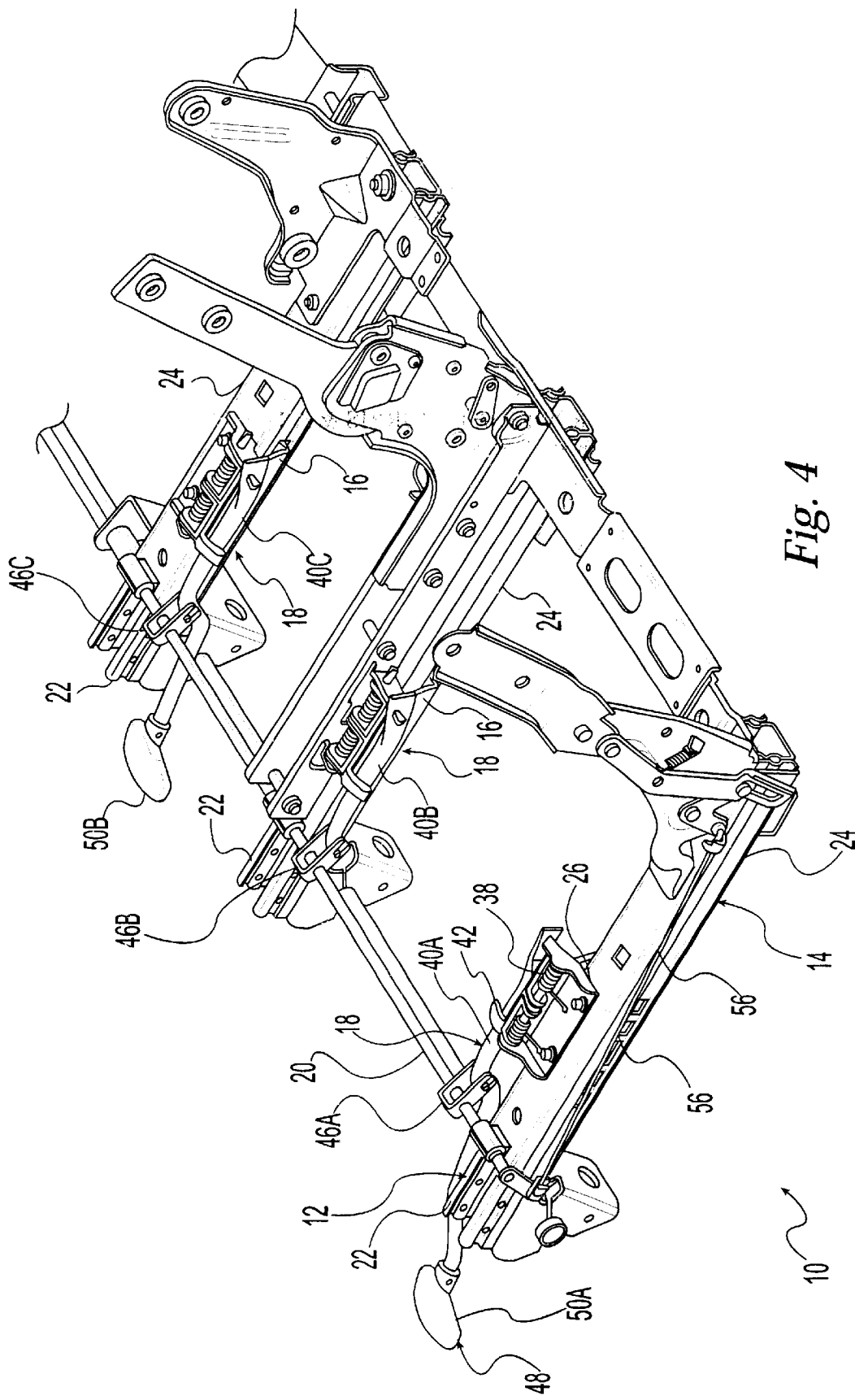
FIG. 4 is a perspective view of an embodiment of the seat track assembly of the present invention utilizing three pairs of tracks.
Figure 5:
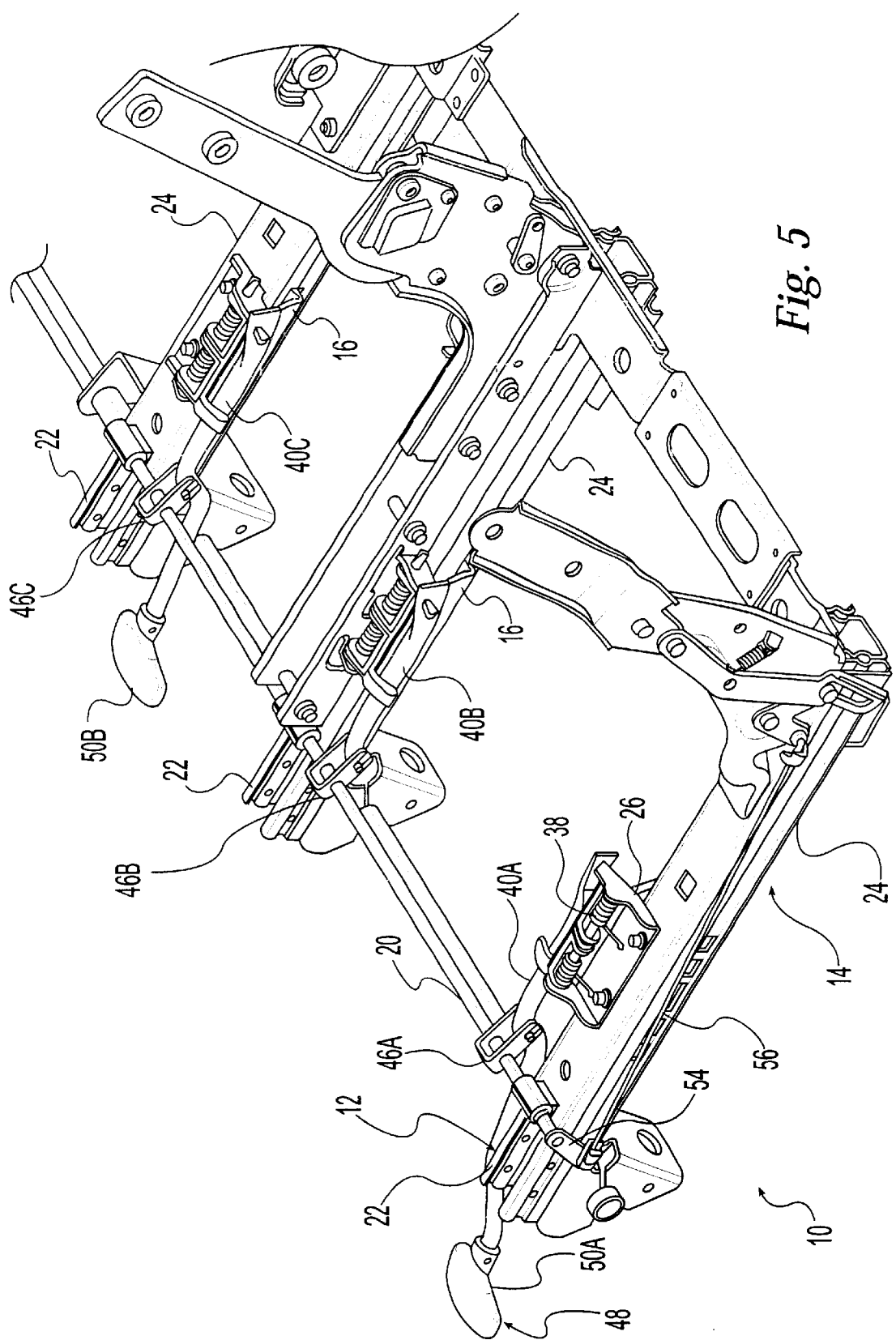
FIG. 5 is an enlarged perspective view of a portion of the seat track assembly shown in FIG. 4.

FIGS. 4–6 illustrate an embodiment of the present invention having three pairs of lower 22 and upper 24 tracks. Each lower track 22 has a corresponding upper track 24, and each upper track 24 has a corresponding locking device 16. Each locking device 16 has a corresponding lever 40 operatively connected to the locking device 16 and operatively connected to the rod 20 with a corresponding link member 46.

Each one of the upper tracks 24 operably engages one of the lower tracks 22 so that each upper track 24 is slideable between a full forward position and a full rearward position with respect to the respective lower track 22. Each one of the locking devices 16 is supported on one of the upper tracks 24 and is moveable between a locked position where the locking device 16 maintains the respective upper track 24 in a desired position relative to the respective lower track 22 and an unlocked position where the respective upper track 24 is movable relative to the respective lower track 22. Each lever 40 is pivotally supported about a first axis, is operatively connected to one of the locking devices 16, and is movable between a normal position and a release position where the lever 40 maintains the respective locking device 16 in the unlocked position when the respective release member 18 is in the release position. The rod 20 is rotatable about a second axis and is operatively connected to each lever 40 such that rotation of one of the levers 40 rotates the other levers 40 and the rod 20 and rotation of the rod 20 rotates the levers 40.

The embodiment illustrated in FIGS. 4–6 includes two release handles 50A, 50B and a control cable 56 with link 54. When the release handle 50A is raised, a first lever 40A is moved from its normal position to its release position, and the rod 20 is caused to rotate by a first link member 46A. Simultaneously, a second link member 46B and a third link member 46C are caused to rotate by the rod 20, and a second lever 40B and a third lever 40C are moved from their normal position to their release position. In this manner, an infinite number of locking devices 16 can be controlled simultaneously by one control member. In a similar manner, when the control cable 56 is pulled, the rod 20 is caused to rotate, thus simultaneously moving each lever 40A, 40B, and 40C from its normal position to its release position. Preferably, the levers 40A, 40B, and 40C are all pivotally mounted about a common first axis that is substantially parallel to a second axis about which the rod 20 is rotatable.

The rod 20 and multiple release members 18 form an improved release mechanism that advantageously allows a control member located in one position to simultaneously control locking devices 16 on multiple pairs of first 12 and second 14 tracks.

From the foregoing disclosure and detailed description of certain preferred embodiments, it will be apparent that various modifications, additions and other alternative embodiments are possible without departing from the true scope and spirit of the present invention. For example, it will be apparent to those skilled in the art, given the benefit of the present disclosure, that the release member can have many different shapes and positions. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A seat track assembly comprising, in combination:
   a first track;
   a second track operably engaging the first track, the second track slideable between a full forward position and a full rearward position with respect to the first track;

a locking device supported on the second track, the locking device moveable between a locked position where the locking device maintains the second track in a desired position relative to the first track and an unlocked position where the second track is movable relative to the first track;

a release member pivotally supported about a first axis, the release member movable between a normal position and a release position, the release member maintaining the locking device in the unlocked position when the release member is in the release position;

a rod rotatable about a second axis different from the first axis, the rod operatively connected to the release member such that rotation of one of the rod or the release member rotates the other of the rod or the release member; and a link member pivotally connected to the release member and fixedly attached to the rod.

2. The seat track assembly of claim 1 wherein the first axis is substantially parallel to the second axis.

3. The seat track assembly of claim 1 wherein the release member comprises a lever operatively connected to the locking device.

4. A seat track assembly comprising, in combination:

a first track;

a second track operably engaging the first track, the second track slideable between a full forward position and a full rearward position with respect to the first track;

a locking device supported on the second track, the locking device moveable between a locked position where the locking device maintains the second track in a desired position relative to the first track and an unlocked position where the second track is movable relative to the first track;

a release member pivotally supported about a first axis, the release member movable between a normal position and a release position, the release member maintaining the locking device in the unlocked position when the release member is in the release position;

a rod rotatable about a second axis different from the first axis, the rod operatively connected to the release member such that rotation of one of the rod or the release member rotates the other of the rod or the release member; and a first control member operatively connected to the release member.

5. The seat track assembly of claim 4 wherein the first control member comprises a release handle.

6. The seat track assembly of claim 4 further comprising a second control member operatively connected to the rod.

7. A seat track assembly comprising, in combination:

a plurality of lower tracks;

a corresponding plurality of upper tracks, each one of the upper tracks operably engaging one of the lower tracks, each upper track slideable between a full forward position and a full rearward position with respect to the respective lower track;

a corresponding plurality of locking devices, each one of the locking devices supported on one of the upper tracks, each locking device moveable between a locked position where the locking device maintains the respective upper track in a desired position relative to the respective lower track and an unlocked position where the respective upper track is movable relative to the respective lower track;

a corresponding plurality of release members, each release member pivotally supported about a first axis, each one of the release members operatively connected to one of the locking devices, each release member movable between a normal position and a release position, each release member maintaining the respective locking device in the unlocked position when the respective release member is in the release position;

a rod rotatable about a second axis, the rod operatively connected to each release member such that rotation of one the release members rotates the other release members and the rod and rotation of the rod rotates the release members; and a first control member operatively connected to one of the release members.

8. The seat track assembly of claim 7 further comprising a second control member operatively connected to the rod.

9. A seat track assembly comprising, in combination:

a first track;

a second track operably engaging the first track, the second track slideable between a full forward position and a full rearward position with respect to the first track;

a locking device supported on the second track, the locking device moveable between a locked position where the locking device maintains the second track in a desired position relative to the first track and an unlocked position where the second track is movable relative to the first track;

a release member pivotally supported about a first axis, the release member movable between a normal position and a release position, the release member maintaining the locking device in the unlocked position when the release member is in the release position;

a rod rotatable about a second axis; and a link member pivotally connected to the release member and fixedly attached to the rod such that rotation of one of the rod or the release member rotates the other of the rod or the release member.

10. The seat track assembly of claim 9 wherein the first axis is substantially parallel to the second axis.

11. The seat track assembly of claim 9 wherein the release member comprises a lever operatively connected to the locking device.

12. The seat track assembly of claim 9 further comprising a first control member operatively connected to the release member.

13. The seat track assembly of claim 12 wherein the first control member comprises a release handle.

14. The seat track assembly of claim 9 further comprising a control member operatively connected to the rod.

15. The seat track assembly of claim 14 wherein the control member comprises a control link operatively connected to the rod and a cable connected to the control link.

16. A seat track assembly comprising, in combination:

a first track;

a second track operably engaging the first track, the second track slideable between a full forward position and a full rearward position with respect to the first track;

a locking device supported on the second track, the locking device moveable between a locked position where the locking device maintains the second track in a desired position relative to the first track and an unlocked position where the second track is movable relative to the first track;

a release member pivotally supported about a first axis, the release member movable between a normal position and a release position, the release member maintaining the locking device in the unlocked position when the release member is in the release position;

a rod rotatable about a second axis different from the first axis, the rod operatively connected to the release member such that rotation of one of the rod or the release member rotates the other of the rod or the release member;

a control member operatively connected to the rod; and wherein the control member comprises a link operatively connected to the rod and a cable connected to the link.

17. A seat track assembly comprising, in combination:

a plurality of lower tracks;

a corresponding plurality of upper tracks, each one of the upper tracks operably engaging one of the lower tracks, each upper track slideable between a full forward position and a full rearward position with respect to the respective lower track;

a corresponding plurality of locking devices, each one of the locking devices supported on one of the upper tracks, each locking device moveable between a locked position where the locking device maintains the respective upper track in a desired position relative to the respective lower track and an unlocked position where the respective upper track is movable relative to the respective lower track;

a corresponding plurality of release members, each release member pivotally supported about a first axis, each one of the release members operatively connected to one of the locking devices, each release member movable between a normal position and a release position, each release member maintaining the respective locking device in the unlocked position when the respective release member is in the release position;

a rod rotatable about a second axis, the rod operatively connected to each release member such that rotation of one the release members rotates the other release members and the rod and rotation of the rod rotates the release members; and a corresponding plurality of link members, each link member pivotally connected to one release member and fixedly attached to the rod.

18. The seat track assembly of claim 17 wherein the first axis is substantially parallel to the second axis.

* * * * *